Jan. 24, 1939. E. W. GRENERT 2,144,878
ICE CREEPER FOR AUTOMOBILE TIRES
Filed May 5, 1937
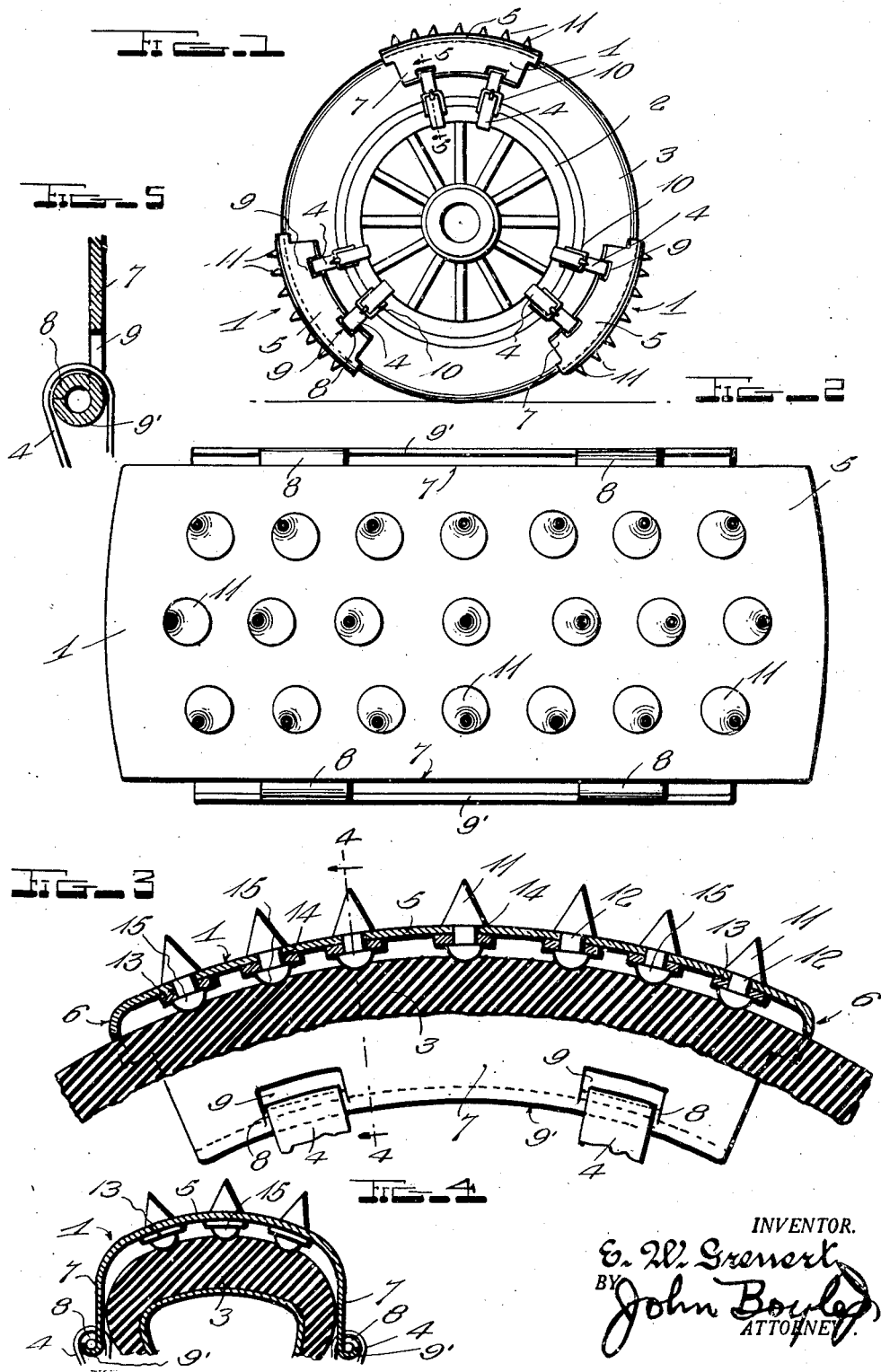
INVENTOR.
E. W. Grenert
BY John Bowles
ATTORNEY.

Patented Jan. 24, 1939

2,144,878

UNITED STATES PATENT OFFICE 2,144,878

ICE CREEPER FOR AUTOMOBILE TIRES

Edward W. Grenert, Wooster, Ohio

Application May 5, 1937, Serial No. 140,937

3 Claims. (Cl. 152—230)

My invention relates to an emergency ice creeper that is adapted for use in connection with automobile tires, to be used when traveling on icy streets or highways, to prevent sliding or skidding on the ice and to provide efficient traction.

One of the objects of the invention is to provide such a device that can be made cheaply, will have good wearing qualities and be efficient in use.

Referring to the drawing for a more complete disclosure of the invention,

Fig. 1 is an elevation of the ice creeper applied to the wheel of an automobile;

Fig. 2 is a top plan view of one of the ice creepers;

Fig. 3 is a longitudinal section through the ice creeper showing the tire in fragmentary section;

Fig. 4 is a transverse section on the line 4—4 of Fig. 3;

Fig. 5 is a fragmentary detail sectional view on the line 5—5 of Fig. 1.

Three of the ice creepers 1 are customarily employed and are detachably secured to the usual automobile wheel 2, that is provided with the usual inflated rubber tire 3, by means of the fastening straps 4.

The ice creeper 1 is pressed into shape from hot rolled steel, having such physical properties that it will give without cracking. The shape into which it is pressed provides a base portion 5, a creeper grip ledge 6, at each end, flanged in against the surface of the tire in order to prevent anything from getting underneath the creeper. The creeper is also shaped to provide flanges 7 on each side of the tire and which are so shaped as to avoid cutting the tire.

Struck out of the side flanges 7 are the portions 8 which provide apertures 9, through which the holding straps 4 pass. These portions 8 are rolled over so as not to cut the straps and conform in curvature to the rolled over ends 9' of the side flanges 7, which rolled over ends avoid cutting the tire. There are two of these strap openings on each flange 7 for engagement with the straps 4, which are provided with the customary buckles 10 for holding the creepers securely in position on the wheel.

Stamped in the base 5 of the creeper are three rows of apertures 14 in which are riveted the creeper cones 11, made of steel of a type that will give good service. The cones are provided with a shank portion 12 that are inserted through the apertures 14 and washers 13 and then the shanks 12 are hot riveted to provide a head 15 which grips the tire and serves to prevent the creeper from sliding on the tire. The cones when set in place and riveted are so located as to give the same service for forward or backward movement of the wheel.

From the above description, it will be apparent that I have produced a device of the character described, which possesses all the features enumerated as desirable and while I have illustrated and described the preferred form of the invention, it will be understood that I reserve the right to all changes properly falling within the scope and spirit of the appended claims.

Therefore, what I claim as new and desire to secure by Letters Patent, is:

1. A steel ice creeper for automobile tires in the form of a segment of a circle and pressed into a longitudinally curved channel shape and having such physical properties that it will give without cracking, and having a base portion that is provided with a series of cones along its length and width on the outer side and with heads on the inner side for simultaneous engagement with the tread of the tire to prevent the creeper from sliding on the tire and a gripping ledge flanged at the ends of the base portion and means engaging the creeper and the wheel felly for holding the creeper tightly against the tire tread.

2. A steel ice creeper for automobile tires in the form of a segment of a circle and having a substantially rigid curved base portion, side flanges and end flanges, straps engaging the side flanges for securing the creeper to the tire, the end flanges engaging the tread of the tire, a series of apertures in the base portion along its length, steel cones projecting from the outer side of the base portion and having shanks passing through the apertures, the inner ends of the shanks being provided with heads that simultaneously engage the tire tread to prevent the creeper from slipping thereon.

3. A steel ice creeper for automobile tires in the form of a segment of a circle and having a substantially rigid curved base portion, side flanges and end flanges, steel cones projecting from the outer side of the base portion, straps engaging the side flanges and the wheel for securing the creeper tightly to the tire, the end flanges engaging the tread of the tire to prevent the creeper from slipping thereon and to prevent anything from getting underneath the creeper.

EDWARD W. GRENERT.